United States Patent [19]

Farmer

[11] Patent Number: 4,925,142
[45] Date of Patent: May 15, 1990

[54] ELECTRICAL UTILITY POLE DAVIT ARM

[75] Inventor: Marion R. Farmer, Germantown, Tenn.

[73] Assignee: Aluma-Form, Inc., Memphis, Tenn.

[21] Appl. No.: 251,123

[22] Filed: Sep. 29, 1988

[51] Int. Cl.⁵ .............................................. F16L 3/00
[52] U.S. Cl. ................................ 248/219.4; 403/267; 403/374
[58] Field of Search ............... 248/219.4, 219.3, 218.4, 248/231.3, 316.2; 403/266, 267, 368, 374

[56] References Cited

U.S. PATENT DOCUMENTS

| | | | |
|---|---|---|---|
| 1,843,454 | 2/1932 | Manson | 248/219.3 |
| 3,104,122 | 9/1963 | Daniels | 248/219.4 X |
| 3,156,418 | 11/1964 | Jablonski et al. | 403/368 X |
| 3,272,463 | 9/1966 | Greig | 248/219.3 X |
| 3,468,506 | 9/1969 | Curlee | 248/219.3 |
| 3,514,591 | 5/1970 | De Vos | 248/219.4 X |
| 4,522,363 | 6/1985 | Stuart | 248/218.4 X |
| 4,579,306 | 4/1986 | Kellett et al. | 248/74.1 |

Primary Examiner—David M. Purol
Attorney, Agent, or Firm—Paul M. Denk

[57] ABSTRACT

A davit arm for an electrical utility pole or the like is disclosed and is adapted to support an electrical conductor or fiber optic cable on an associated electrical utility pole. The davit arm includes an elongated self-supporting body adapted to support the electrical conductor or fiber optic cable at free end thereof. A hollow support member is positioned over an opposite end of the elongated body and includes an integral, generally transversely extending supporting flange which is adapted to be attached to an associated utility pole for mounting the elongated self-supporting body in a substantially normal stand-off position relative to the utility pole. The elongated self-supporting body is positively secured within the hollow support member so as maintain the elongated body in assembled relationship thereto during use of the davit arm on an associated utility pole. Combination mechanical wedging and chemical bonding elements are interposed between the elongated self-supporting body and an inner circumferential wall of the hollow supporting member for positively securing the elongated self-supporting body and hollow support member to each other.

14 Claims, 3 Drawing Sheets

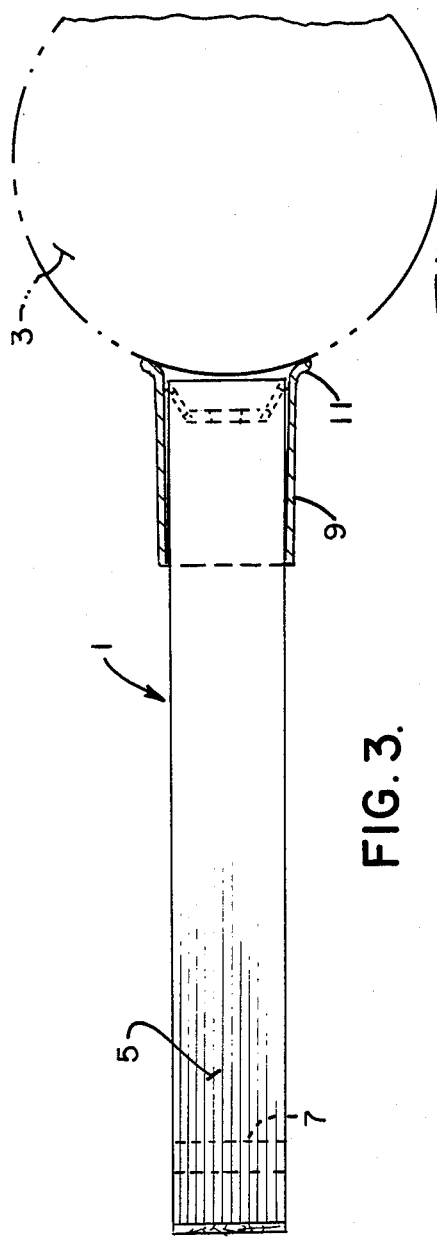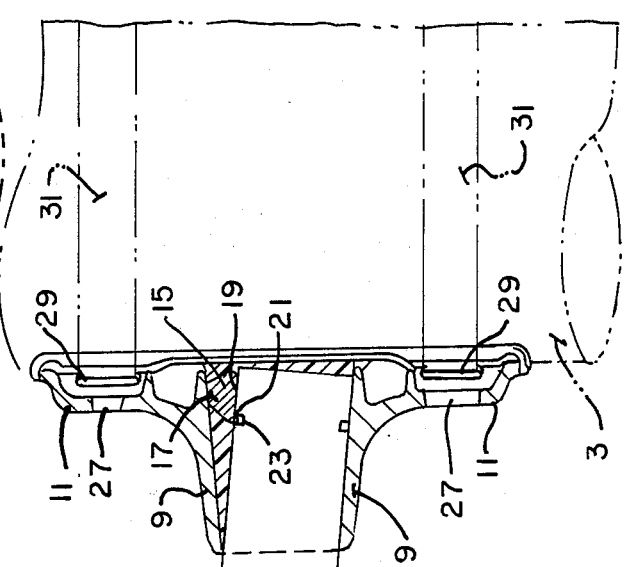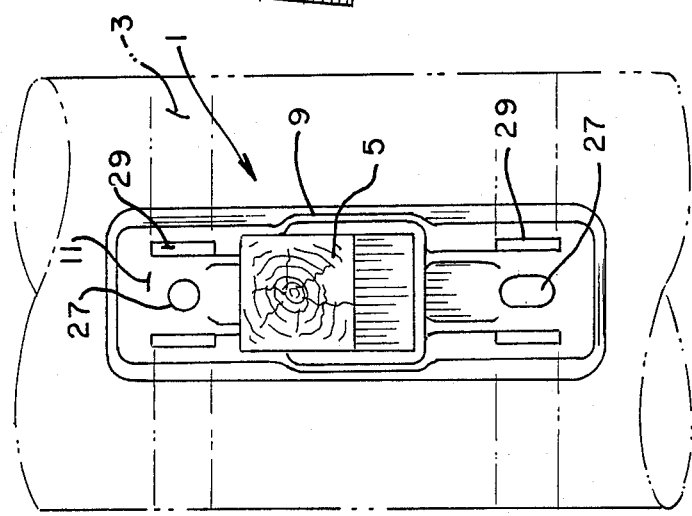

4,925,142

ELECTRICAL UTILITY POLE DAVIT ARM

BACKGROUND OF THE INVENTION

The present invention relates to a davit arm for electric utility poles, and more particularly, to a davit or stand-off arm for supporting an electrical conductor or fiber optic cable in spaced relationship to an associated utility pole.

Utility poles have been used principally for supporting electrical conducting lines (telephone and power lines) from pole to pole across the landscape. In recent years, TV cable companies have also used utility poles to convey cable tv lines through various areas. TV cable lines are typically mounted high up near the telephone and power lines because of the inherent potential for electrical injury. Where fiber optic cable lines are desired to be mounted to utility poles, they can be mounted in a relatively low position on the utility pole, such as half-way up the pole, for example.

For mounting either electrical conductors or various types of fiber optic cables to utility poles, the electrical conductors or fiber optic cables are preferably mounted to extend from one side of the pole, either close to or spaced downwardly from the telephone and power lines, as well as being laterally spaced outwardly from the associated utility pole. As will be appreciated, the weight of the electrical conductor or fiber optic cable between adjacent utility poles requires a mounting system which will support substantial weight laterally outwardly from an associated utility pole along one side thereof. One design requirement or industry standard that has been established for such mounting systems is that they must be able to withstand up to 2000 pounds of weight at a position 18 inches laterally offset outwardly from an associated utility pole. In addition, of course, the mounting system must withstand the rigors of an outdoor environment.

SUMMARY OF THE INVENTION

Among the several objects and advantages of the present invention may be noted:

the provision of a mounting system for a utility pole, adapted to support an electrical conductor or fiber optic cable laterally outwardly therefrom, which is constructed and designed to meet the aforementioned standards, requirements and needs of electrical utilities and other users;

the provision of the aforementioned mounting system, in the form of a davit arm which is adapted to support an electrical conductor or fiber optic cable in a position laterally outwardly offset from an associated utility pole;

the provision of the aforementioned davit arm which provides a rigid self-supporting arm and stable mounting arrangement for an associated utility pole;

the provision of the aforementioned davit arm in which the davit arm is positively secured to and within a hollow support member adapted to be mounted to an associated utility pole;

the provision of the aforementioned davit arm which is postively secured to and within a hollow support member by combination mechanical wedging and chemical bonding elements in a novel, simple and efficient system; and the provision of the aforementioned davit which is easy to manufacture and assemble by well-known manufacturing techniques; uses widely available material; is relatively economical in construction and use; is extremely durable and long lasting in use; and is otherwise well adapted for the purposes intended.

Briefly stated, the davit arm for the present invention is adapted to support an electrical conductor for fiber optic cable laterally outwardly offset from an associated electrical utility pole and includes an elongated self-supporting body which is adapted to support an electrical conductor or fiber optic cable at a free end thereof, a hollow support member positioned over an opposite end of the elongated body and including and integral, generally transversely extending supporting flange which is adapted to be attached to a utility pole for mounting the elongated self-supporting body in a substantially normal stand-off position relative to an associated utility pole; and means for positively securing the elongated body within the hollow support member in order to maintain the elongated body in assembled relationship relative to the hollow support member during use of the davit arm on an associated utility pole.

For positively securing the elongated body within the hollow support member, combination mechanical wedging and chemical bonding means are interposed between the elongated body and an inner circumferential wall of the hollow support member. The mechanical wedging means includes at least one mechanical wedge device which may also include at least one laterally outwardly offset rib for interlocking engagement relative to a complementary shaped recess provided in the elongated body. The mechanical wedge device may include a complementary tapered outer wall surface for contacting engagement with an inner circumferential tapered wall of the hollow support member. The chemical bonding means includes a cured polymer resin which extends around the mechanical wedge device and between the inner circumferential tapered wall and the elongated body.

The elongated body may be made of wood the hollow support member including integral, generally transversely extending supporting flange made of aluminum, the at least one mechanical wedge device is made of aluminum, and the cured polymer resin may include curing catalyst therein. For attaching the davit arm to an associated utility pole, fastener openings may be provided in the transversely extending supporting flange or lateral openings may be provided in the transversely extending supporting flange for receiving a band extending therethrough and around an associated utility pole.

These and other objects and advantages of the present invention will become more apparent from the ensuing description.

BRIEF DESCRIPTION OF THE DRAWINGS

In the drawings.

FIG. 2 is an enlarged side elevational view, partly in section, of the davit arm of the present invention, also shown as being mounted to utility pole, again shown in phantom lines;

FIG. 3 is a top plan view of the davit arm, partially in section, as mounted to an associated utility pole, again illustrated in phantom lines;

FIG. 4 is an end elevational view of the davit arm of the present invention mounted to an associated utility pole shown in phantom lines;

Corresponding reference numerals will be used throughout the several figures of the drawings.

DESCRIPTION OF THE PREFERRED EMBODIMENTS

Figure 1:
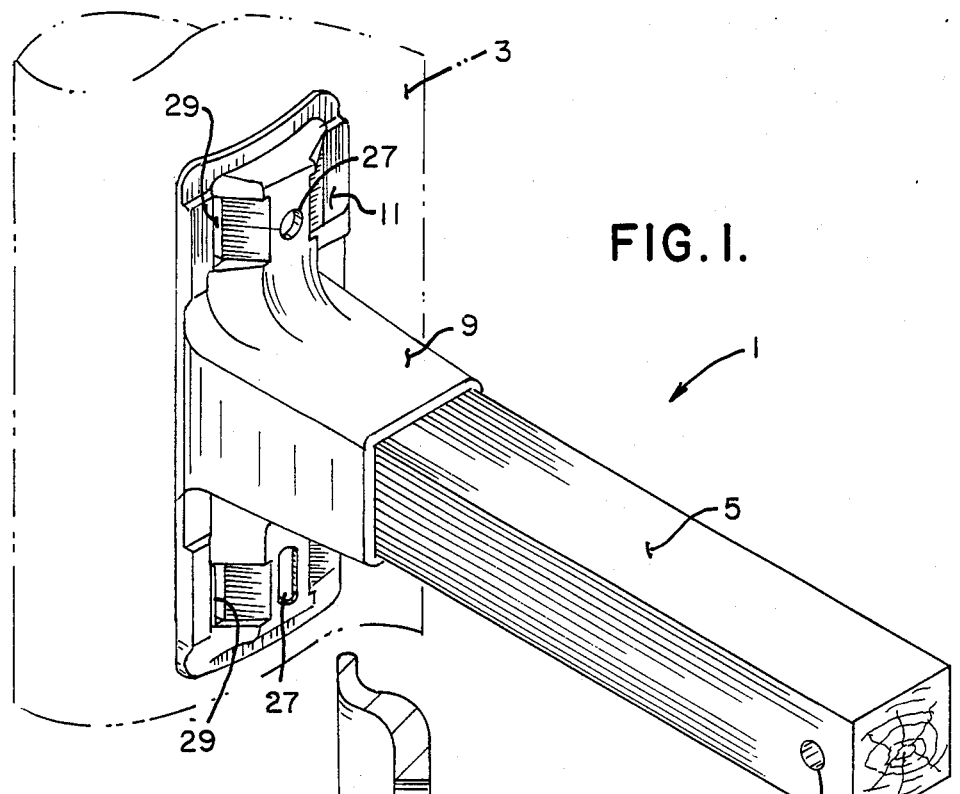
FIG. 1 is an isometric view of a davit arm, constructed in accordance with the teachings of the present invention, for supporting an electrical conductor or fiber optic cable in laterally outwardly offset relationship to an associated utility pole, which is shown in phantom lines.

In the description that is to follow, it is to be understood that the term "davit" arm or device, while generally understood to mean a fixed or movable crane that projects over the side of a ship or over a hatchway for use in hoisting cargo, anchors and the like, is to be also used in the present description to define a fixed arm that extends a predetermined distance outwardly from an associated utility pole.

As seen in the various forms and constructions in FIGS. 1–8 of the drawings, the davit arm 1, shown as being mounted to an associated utility pole 3, includes an elongated self-supporting body 5. The elongated self-supporting body 5 is preferably polygonal or square-shaped for added rigidity and support, and for other reasons which will become apparent. Although the elongated self-supporting body 5 may be made of wood, plastic or metal materials, preferably, the material of choice is a Southeast Asia wood known as Apitong, from the *diptherocarpus* species, which has outstanding strength and durability characteristics. At the free end of the elongated self-supporting body 5, there may be provided an opening of suitable size and dimension for receiving an electrical conductor or fiber optic cable (not shown).

As discussed above, electrical utility industry standards and requirements may dictate that the elongated self-supporting body 5 support up to 2,000 pounds at a distance 18 inches laterally outwardly offset from the associated utility pole 3. As will be appreciated, electrical conductors or fiber optic cables extending through the opening 7 at the free end of the elongated self-supporting body 5 will expose the body 5 to substantial weight. As a result, it is necessary to securely mount the elongated self-supporting body 5 in a secure and stable mounting position relative to an associated utility pole 3, while attaching the elongated self-supporting body 5 to the associated utility pole 3.

For this purpose, the hollow support member 9 is positioned over an opposite end of the elongated body and includes an integral, generally transversely extending supporting flange 11 which extends on opposite sides of the elongated body 5 and is constructed to facilitate the attachment and mounting of the elongated self-supporting body in a substantially normal stand-off position relative to the associated utility pole 3. The hollow support member 9 is preferably made from aluminum and is constructed as described below for as a lightweight yet strong device.

Figure 5:
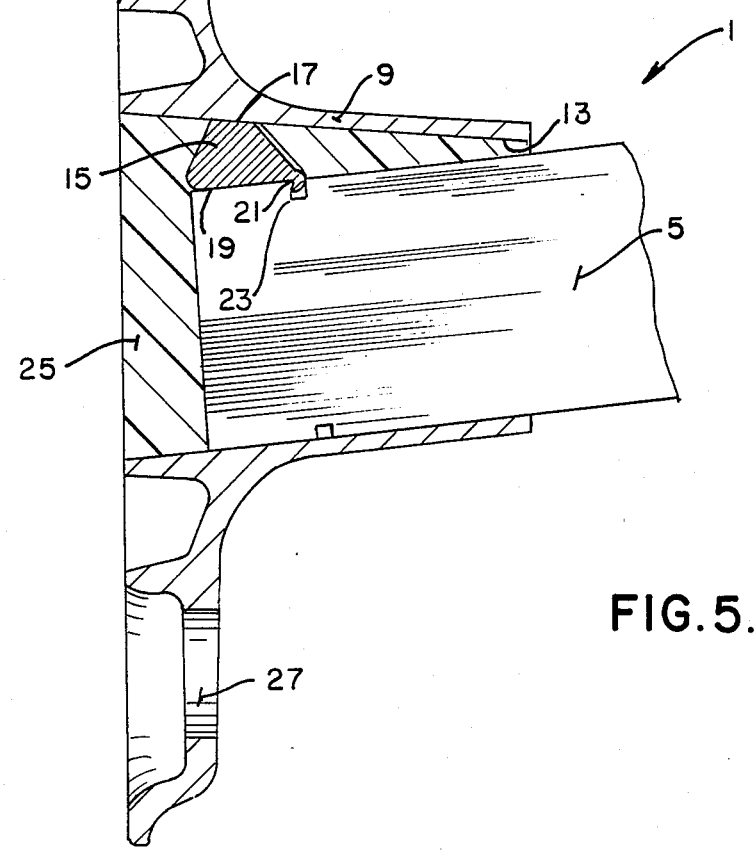
FIG. 5 is an enlarged fragmentary sectional view of the davit arm of the present invention, and showing the manner in which the elongated self-supporting body is positively secured to a hollow support member that is capable of being attached to an associated utility pole.

In order to positively secure the elongated body 5 within the hollow support member 9, combination mechanical wedging and chemical bonding means are employed. Specifically, the hollow support member 9 includes an inner circumferential tapered wall 13 which tapers inwardly from the supporting flange 11 toward the elongated body 5, as best seen in FIG. 5 of the drawings. A wedge element 15, also preferably made from aluminum, is shown in FIGS. 2–5 of the drawings as including a generally triangular-shaped wedge body having a complementary tapered outer wall surface 17 which contacts and engages the inner circumferential tapered wall 13 of the hollow support member, while a tapered inner wall surface 19 thereof is positioned for contacting engagement with one of the walls or sides of the polygonally-shaped elongated self-supporting body 5. It will be noted that both of the outer and inner wall surfaces 17, 19 respectively of the mechanical wedge generally taper toward one another, such that when the wedge 15 is mounted in the position shown in FIGS. 2 and 5 of the drawings, the elongated body 5 will be forced or brought into contacting engagement with the inner tapered wall surface 13 of the hollow support member 9, along one side thereof, by the wedge 15, as the outer side wall 17 of the wedge 15 engages the inner tapered wall 13 of the hollow support member 9, and the inner wall 19 of the wedge element 15 engages one of the walls or sides of the elongated self-supporting body 5, which is opposed from the wall or side of the elongated self-supporting body 5 that engages the inner tapered circumferential wall 13 of the hollow support member 9.

In order to maintain the wedge element 15 in a desired position relative to the elongated self-supporting body 5, a laterally outwardly offset rib 21 is received within a complementary shaped recess 23 for innerlocking engagement thereto. This facilitates maintaining the wedge element adjacent or near one end of the elongated self-supporting body 5 that is to be positively secured and mounted within the hollow support member 9.

In addition to the wedge element 15, a chemical adhesive or bonding element 25 with curing catalyst therein is poured or injected into remaining open areas surrounding the wedge element 15 and between the inner tapered circumferential wall 13 of the hollow support member 9 and the elongated self-supporting body 5. As best seen in FIGS. 2 and 5 of the drawings, the chemical bonding material or cured polymer resin 25 extends along one side of the elongated self-supporting body 5 and the tapered inner wall 13 of the hollow support member 9, as well as along the end of the elongated self-supporting body 5. As a result, the wedge element 15 is maintained in a fixed position, holding the elongated self-supporting body 5 within the hollow support member 9, while the chemical bonding material or cured polymer resin 25 structurally supports and prevents any movement of the elongated self-supporting body 5 relative to the hollow support member 9. A variety of chemical bonding materials or cured polymer resins may be selected, as desired, as long as they meets the standards and requirements of the Electrical Power Research Institute of San Jose, Calif. Curing or setting time, strength, durability, resistance to the elements of nature and the like are important considerations in the selection of the chemical bonding material or cured polymer resin 25. To facilitate flow of the bonding material around the wedge section disposed within the opening of the hollow support member, in the preferred embodiment, while the hollow member may have a dimension of approximately three inches, the wedge section may have a width of approximately one to one and one-half inches.

For attaching the generally transversely extending supporting flange 11 to an associated utility pole 3, suitable openings 27 may be provided in the flange 11, one of which is elongated to facilitate the adjusted mounting of the davit arm 1 to the utility pole 3. In lieu of the fastener openings 27, aligned lateral openings 29 may be provided in the flange 11 for receiving banding elements 31 extending therethrough and around an associated utility pole 3.

With the FIGS. 2-5 embodiment, the davit arm 1, when mounted to an associated utility pole 3 has a slightly upward angular position relative to a horizontal plane extending transversely to a longitudinal axis of the utility pole 3. As has been discussed above, this is due to the manner in which the wedge element 15 engages one side of the elongated self-supporting polygonal body 5 within the hollow supporting member 9.

Figure 6:
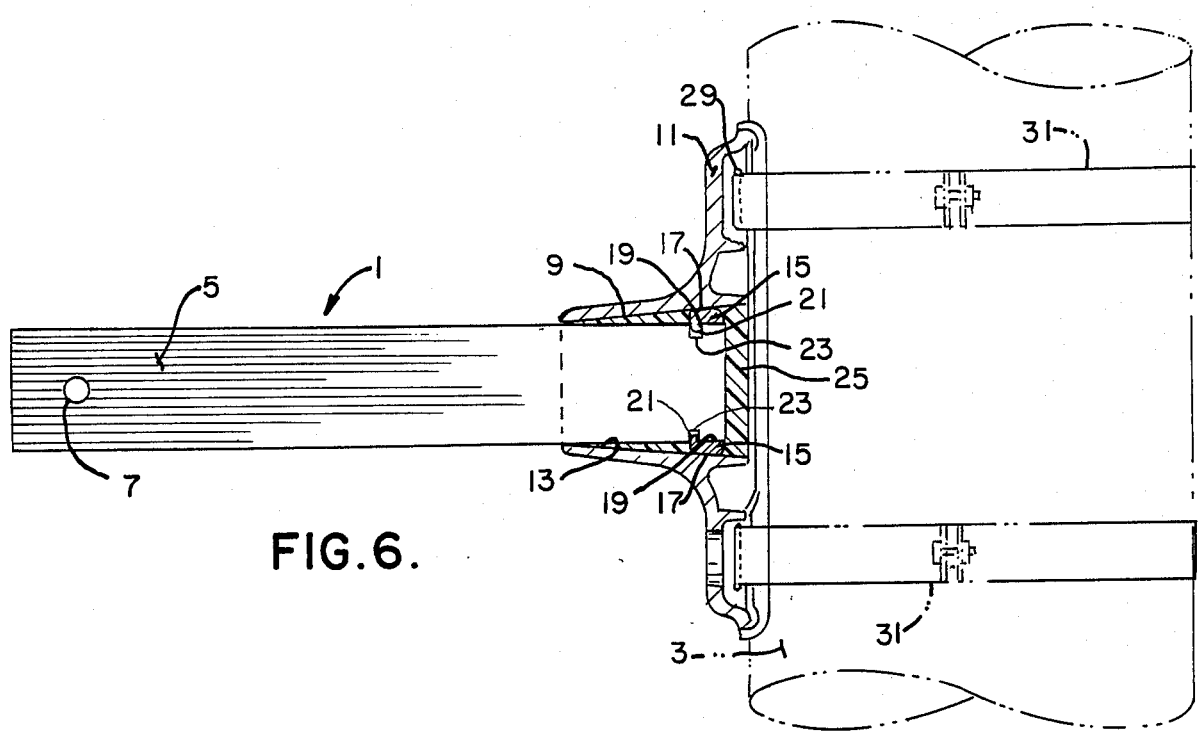
FIG. 6 is a side elevational view, partially in section, of a modified form of davit arm according to the present invention, and illustrating banding elements for attaching the davit arm relative to an associated utility pole, also shown in phantom lines.

In lieu of a single wedge element 15 and/or where it is desired for the elongated self-supporting body 5 to extend substantially normal to the associated utility pole 3, a pair of wedge elements 15, 15 may be wedged into position between the elongated self-supporting body 5 on opposite sides of the internal circumferential tapered wall 13 of the hollow support member 9, as shown in FIG. 6 of the drawings. Each of the wedge elements 15 may be provided with a laterally outwardly offset rib 21 to be received within the complementary recess 23 of the elongated self-supporting body 5, to hold same in position during assembly of the components, as discussed above. Once the wedge elements 15, 15 are positioned as shown in FIG. 6 of the drawings, the chemical bonding material or cured polymer resin 25 may be poured or inserted into the remaining or open areas between the elongated body 5 and the hollow support member 9, to fill up the remaining gaps and prevent separation or movement of the assembled components relative one another, while affording mounting strength or rigidity to the elongated self-supporting body 5 relative to the hollow support member 9.

Figure 7:
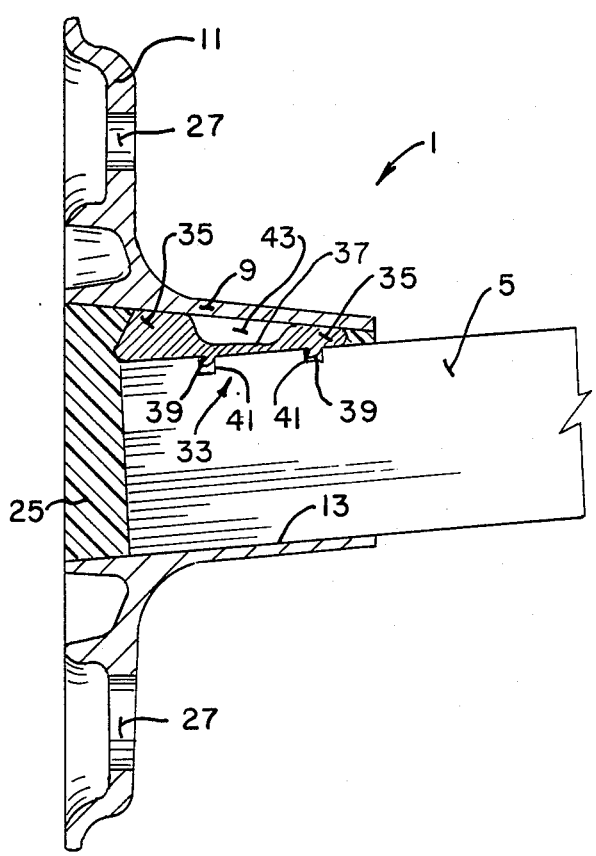
FIG. 7 is an enlarged fragmentary sectional view of another modified form of davit arm according to the present invention.

The wedge element may be varied as desired, thus varying the amount of chemical bonding element used, as well. As shown in FIG. 7 of the drawings, the wedge element 33 includes a pair of wedge sections 35, 35 separated by an integral connecting wall 37. The wedge element 33 may be provided with spaced, laterally outwardly offset ribs 39, 39 for reception within spaced complementary shaped recesses 41, 41 provided in the elongated body 5. In this embodiment, the wedge element 33 engages the internal tapered wall 13 of the hollow support member 9 and a corresponding area of the elongated body 5 over a greater predetermined distance, leaving a hollow space 43 between the spaced wedge elements 35, 35. As a result, less chemical bonding material or cured polymer resin 25 is required in this embodiment. Except for the shape of the wedge element 33 and corresponding lessening of the chemical bonding material or cured polymer resin 25 used, the davit arm 1 in the FIG. 7 embodiment functions similar to the FIGS. 2-5 embodiment which employs a single wedge element 15.

Figure 8:
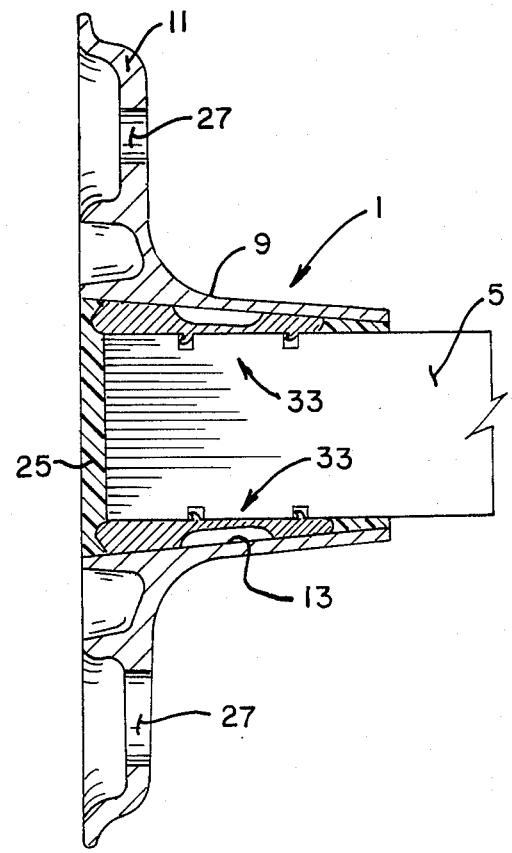
FIG. 8 is an enlarged fragmentary sectional view of still another modified form of davit arm construction according to the present invention.

In FIG. 8 of the drawings, opposed wedge elements 33, 33, constructed as described above in connection of FIG. 7 of the drawings, are employed on opposite sides of the elongated body 5, similar to the FIG. 6 embodiment, where wedge elements 15, 15 are employed. As will be noted, the wedge elements 33, 33 are constructed to extend over a greater length, requiring less chemical bonding material or cured polymer resin 25 then the FIG. 6 embodiment, but otherwise operating generally in the same fashion as described above.

From the foregoing, it will be appreciated that the davit arm of the present invention is adapted to support an electrical conductor or fiber optic cable in laterally outwardly offset relationship to an associated utility pole. The components of the davit arm are positively secured to one another in order to maintain their assembled relationship during use of the davit arm or associated utility pole. Simplicity, strength and durability are the hallmark characteristics of the davit arm of the present invention, as will know be understood.

In view of the above, it will be seen that the several objects and features of this invention are achieved and other advantages results obtained.

As various changes could be made in the above constructions without departing from the scope of the invention, it is intended that all matter contained in the above description or shown in the accompanying drawings shall be interpreted as illustrative and not in a limiting sense.

I claim:

1. A davit arm for an electrical utility pole adapted to support an electrical conductor of fiber optic cable in laterally, outwardly offset relationship to an associate utility pole, comprising:

an elongated self-supporting body adapted to support an electrical conductor or fiber optic cable at a free end thereof;

a hollow support member positioned over an opposite end of said elongated body and including an integral, generally transversely extending supporting flange adapted to be attached to a utility pole for mounting said elongated self-supporting body in a substantially normal stand-off position relative to an associated utility pole;

means for positively securing said elongated body within said hollow support member to maintain said elongated body in assembled relationship relative to said hollow support member during use of the davit arm on an associated utility pole, the hollow support member includes an inner circumferential wall which tapers inwardly from said supporting flange towards said elongated body, a wedging means positioned between said inner circumferential tapered wall and said elongated body for positively securing the elongated body within said hollow support member, said wedging means includes at least one mechanical wedge device between said inner circumferential tapered wall and said elongated self-supporting body, said wedging means further includes a cured polymer resin which extends around said mechanical wedge device and between said inner circumferential tapered wall and said elongated self-supporting body, and said mechanical wedge device includes at least one laterally outwardly offset rib for interlocking engagement relative to a complementary shaped recess provided in said elongated body.

2. The davit arm as defined in claim 1 wherein said at least one mechanical wedge device includes a complementary tapered outer wall surface for contacting engagement with the inner circumferential tapered wall of said hollow support member.

3. The davit arm as defined in claim 2 wherein said elongated body and said inner circumferential tapered wall of said hollow support member each have polygonal configurations.

4. The davit arm as defined in claim 3 wherein there is only one mechanical wedge device interposed between adjacent polygonal walls of said polygonally shaped elongated body and inner circumferential tapered wall.

5. The davit arm as defined in claim 4 wherein said one mechanical wedge device includes a pair of spaced laterally outwardly offset ribs for interlocking engagement within complementary shaped recesses provided in said elongated body.

6. The davit arm as defined in claim 3 wherein there are a pair of mechanical wedge devices on opposite sides of the elongated body and interposed between said elongated body and adjacent polygonal walls of said inner circumferential tapered wall.

7. The davit arm as defined in claim 6 wherein each mechanical wedge device includes a pair of spaced laterally outwardly offset ribs for interlocking engagement within complementary shaped recesses provided in said elongated body.

8. The davit arm as defined in claim 3 wherein said elongated body is made of wood, said hollow support member and integral, generally transversely extending supporting flange is made of aluminum, said at least one mechanical wedge device is made of aluminum, and said cured polymer resin includes curing catalysts therein.

9. The davit arm as defined in claim 8 wherein said transversely extending supporting flange extends on opposite sides of said hollow support member and includes means enabling attachment of said transversely extending support flange to an associated utility pole.

10. The davit arm as defined in claim 9 wherein said attachment means includes openings in the transversely extending supporting flange for receiving fasteners to attach the davit arm to an associated utility pole.

11. The davit arm as defined in claim 9 wherein said attachment means includes lateral openings in the transversely extending supporting flange for receiving a band extending therethrough and around an associated utility pole.

12. A davit arm for an electrical utility pole adapted to support an electrical conductor or fiber optic cable in laterally, outwardly offset relationship to an associated utility pole, comprising:

an elongated and polygonally shaped self-supporting body adapted to support an electrical conductor or fiber optic cable at a free end thereof;

a hollow support member positioned over an opposite end of said elongated body and including an integral, generally transversely extending supporting flange adapted to be attached to a utility pole for mounting said elongated self-supporting body in a substantially normal stand-off position relative to an associated utility pole, said hollow support member including an inner circumferential wall which tapers inwardly from the supporting flange toward said elongated body, combination mechanical wedging and chemical bonding means interposed between said elongated body and said inner circumferential wall for positively securing said elongated body relative to said hollow support member in order to maintain said elongated body in assembled relationship to said hollow support member during use of the davit arm on an associated utility pole, the inner circumferential wall of said hollow support member is also polygonally and generally complementary shaped relative to said polygonally shaped elongated body, the mechanical wedge means includes a complementary tapered outer wall surface for contacting engagement with the inner circumferential tapered wall of said hollow support member, and said mechanical wedge means includes at least one laterally, outwardly offset rib for interlocking engagement relative to a complementary shaped recess provided in said elongated body.

13. The davit arm as defined in claim 12 wherein the chemical bonding means includes a cured polymer resin which extends around said mechanical wedge means and between said inner circumferential tapered wall and said elongated body.

14. A davit arm for an electrical utility pole adapted to support an electrical conductor or fiber optic cable in laterally, outwardly offset relationship to an associate utility pole, comprising, an elongated self-supporting body adapted to support an electrical conductor or fiber optic cable at a free end thereof;

a hollow support member positioned over an opposite end of said elongated body and including an integral, generally transversely extending supporting flange, adapted to be attached to a utility pole for mounting said elongated self-supporting body in a substantially normal stand-off position relative to an associated utility pole;

means for positively securing said elongated body within said hollow support member to maintain said elongated body in assembled relationship relative to said hollow support member during use of the davit arm on an associated utility pole, said hollow support member includes an inner circumferential wall which tapers inwardly from said supporting flange towards said elongated body, and wedging means positioned between said inner circumferential tapered wall and said elongated body for positively securing the elongated body within said hollow support member, said wedging means includes at least one mechanical wedge device between said inner circumferential tapered wall and said elongated self-supporting body, and said wedging means further includes a cured polymer resin which extends around said mechanical wedge device and between said inner circumferential tapered wall and said elongated self-supporting body.

* * * * *